United States Patent
Simmons et al.

(10) Patent No.: US 9,803,715 B1
(45) Date of Patent: Oct. 31, 2017

(54) SAFETY STRAP APPARATUS TO PROTECT A SUPER SINGLE TRUCK RIM FROM DAMAGE DURING A TIRE BLOWOUT

(71) Applicants: Robert J. Simmons, Phoenix, AZ (US); Lisa J. Simmons, Phoenix, AZ (US)

(72) Inventors: Robert J. Simmons, Phoenix, AZ (US); Lisa J. Simmons, Phoenix, AZ (US)

( * ) Notice: Subject to any disclaimer, the term of this patent is extended or adjusted under 35 U.S.C. 154(b) by 0 days.

(21) Appl. No.: 15/261,735

(22) Filed: Sep. 9, 2016

Related U.S. Application Data

(60) Provisional application No. 62/283,789, filed on Sep. 11, 2015.

(51) Int. Cl.
*B60D 1/28* (2006.01)
*F16F 9/58* (2006.01)
*B60G 9/02* (2006.01)

(52) U.S. Cl.
CPC .................. *F16F 9/58* (2013.01); *B60G 9/02* (2013.01); *B60G 2204/4504* (2013.01)

(58) Field of Classification Search
CPC ....................................................... B60P 3/075
USPC ......... 410/8, 10, 11, 12, 13, 23, 20; 180/271
See application file for complete search history.

(56) References Cited

U.S. PATENT DOCUMENTS

| | | | |
|---|---|---|---|
| 1,770,798 A * | 7/1930 | Nicholson | B60P 3/075 410/20 |
| 2,046,855 A * | 7/1936 | Tobin | B60P 3/073 24/129 R |
| 4,611,961 A * | 9/1986 | Van Iperen | B60P 3/075 248/499 |
| 4,792,268 A * | 12/1988 | Smith | B60P 3/07 410/12 |
| 4,960,353 A * | 10/1990 | Thorndyke | B60P 3/075 410/10 |
| 4,993,898 A * | 2/1991 | Klahold | B61D 45/001 410/103 |
| 5,011,347 A * | 4/1991 | Bullock | B61D 45/004 410/10 |
| 5,171,036 A | 12/1992 | Ross | |
| 5,902,082 A * | 5/1999 | Kaemper | B60P 3/075 410/10 |

(Continued)

FOREIGN PATENT DOCUMENTS

CA    2074056 A1    2/1993

*Primary Examiner* — Toan To
(74) *Attorney, Agent, or Firm* — Plager Schack LLP

(57) ABSTRACT

A safety strap apparatus for use with a vehicle's super single tire to protect a rim of the tire from damage during a tire blowout is provided. The super single tire and rim are coupled to an axle mechanically coupled to a frame of the vehicle by a shock absorber. The safety strap apparatus includes a strap assembly having a first elongated strap coupled to a second elongated strap, the strap assembly having a left end portion having an overlapped portion with end portions of the first and second elongated straps and a right end portion including another end portion of the first elongated strap, the left and right end portions being coupled together to create a loop. The loop is disposed around top and bottom portions of the shock absorber. Tension in the strap assembly supports the rim above the ground during the tire blowout.

6 Claims, 3 Drawing Sheets

(56) References Cited

U.S. PATENT DOCUMENTS

| | | | |
|---|---|---|---|
| 5,941,665 A * | 8/1999 | Dahlin | B60P 3/075 410/10 |
| 6,139,231 A * | 10/2000 | Kissel | B60P 3/075 410/10 |
| 6,439,587 B2 | 8/2002 | Fabris | |
| 7,267,348 B1 | 9/2007 | Klein et al. | |
| 7,416,373 B2 * | 8/2008 | Mock | B60P 3/079 410/100 |
| 7,513,725 B1 * | 4/2009 | Bullock | B60P 3/075 410/10 |
| D616,790 S | 6/2010 | Mear | |
| 7,959,388 B2 * | 6/2011 | Van Keeken | B60P 3/075 410/10 |
| 8,459,666 B2 | 6/2013 | Piehl | |
| 8,851,492 B2 | 10/2014 | Andreasen et al. | |
| 2014/0197614 A1 | 7/2014 | Aalderink | |

* cited by examiner

SAFETY STRAP APPARATUS TO PROTECT A SUPER SINGLE TRUCK RIM FROM DAMAGE DURING A TIRE BLOWOUT

RELATED APPLICATION

The application claims priority to provisional patent application U.S. Ser. No. 62/283,789 filed on Sep. 11, 2015, the entire contents of which is herein incorporated by reference.

BACKGROUND

The embodiments herein relate generally to super single tires used on commercial trucks.

Commercial vehicles such as trucks and trailers have a plurality of tires such as dual tires and wide single tires known as super single tires in the field. Super single tires have several performance advantages over dual tires such as increased stability and reduced weight. This translates to improved fuel efficiency of the trucks and increased savings for the truck operator.

However, super single tires can be problematic and/or costly in the event of a tire blowout. In particular, the super-single tire is coupled to an axle which is connected to a frame of the truck by a shock absorber. In the event of a tire blowout, the shock absorber extends, which causes the tire axle to quickly drop down vertically. As a result, the super single tire and rim contact the ground, which causes the tire, rim and pavement to experience significant damage, especially when the vehicle is in motion. A bent or destroyed rim has to be replaced, which can cost at least $500 and result in considerable roadside delays.

There exists a strap designed to limit the downward travel distance of a suspension system as disclosed in U.S. Pat. No. 5,171,036. In this strap, a pair of bands are designed to extend along the length of a shock absorber. However, there is a need to strengthen the construction and connection of these bands to permit use with super single tires of trucks.

As such, there is a need in the industry for a safety strap apparatus with enhanced strength that overcomes the limitations of the prior art.

SUMMARY

A safety strap apparatus with enhanced strength for use with a super single tire of a vehicle to protect a rim of the super single tire from damage during a blowout of the tire is provided. The super single tire and rim are coupled to an axle mechanically coupled to a frame of the vehicle by a shock absorber. The safety strap apparatus is configured to prevent the rim from contacting a ground surface during a tire blowout. The safety strap apparatus comprises a strap assembly comprising a first elongated strap coupled to a second elongated strap and oriented such that the first and second elongated straps are aligned together, the strap assembly comprising a left end portion and a right end portion, the left end portion comprising an overlapped portion comprising end portions of the first and second elongated straps, the right end portion comprising another end portion of the first elongated strap, the left and right end portions of the strap assembly being coupled together to create a loop, wherein the loop of the strap assembly is configured to be disposed around a top portion of the shock absorber and a bottom portion of the shock absorber, wherein tension in the strap assembly supports the rim above the ground surface during the blowout of the tire.

In an alternative embodiment, the safety strap apparatus comprises a first elongated strap coupled to a second elongated strap and oriented such that the first and second elongated straps are aligned together, the strap assembly comprising a left end portion and a right end portion, each end portion of the left and right end portions comprising an opening, a first fastener disposed through the opening of the left end portion and configured to secure the strap assembly to a top portion of the shock absorber, a second fastener disposed through the opening of the right end portion and configured to secure the strap assembly to a bottom portion of the shock absorber.

BRIEF DESCRIPTION OF THE FIGURES

The detailed description of some embodiments of the invention will be made below with reference to the accompanying figures, wherein the figures disclose one or more embodiments of the present invention.

DETAILED DESCRIPTION OF CERTAIN EMBODIMENTS

Figure 1:
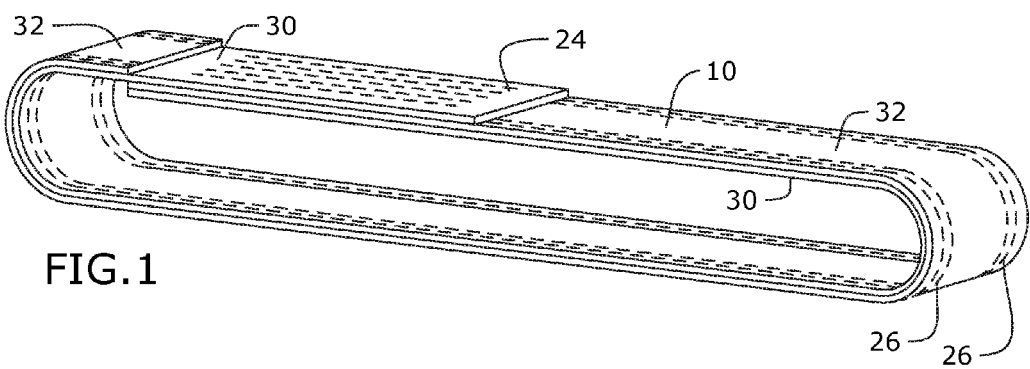
FIG. 1 depicts a perspective view of certain embodiments of the safety strap apparatus.
Figure 2:
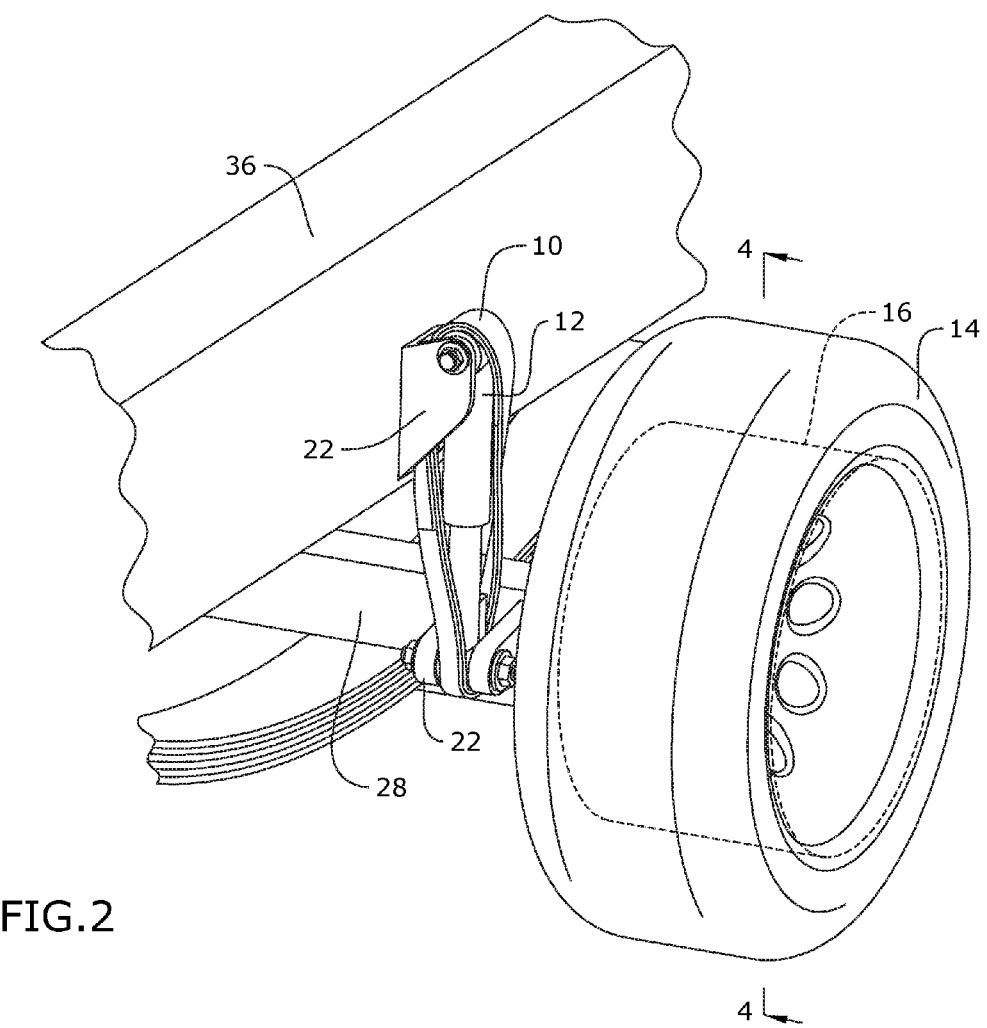
FIG. 2 depicts a perspective view of certain embodiments of the safety strap apparatus shown in use.
Figure 3:
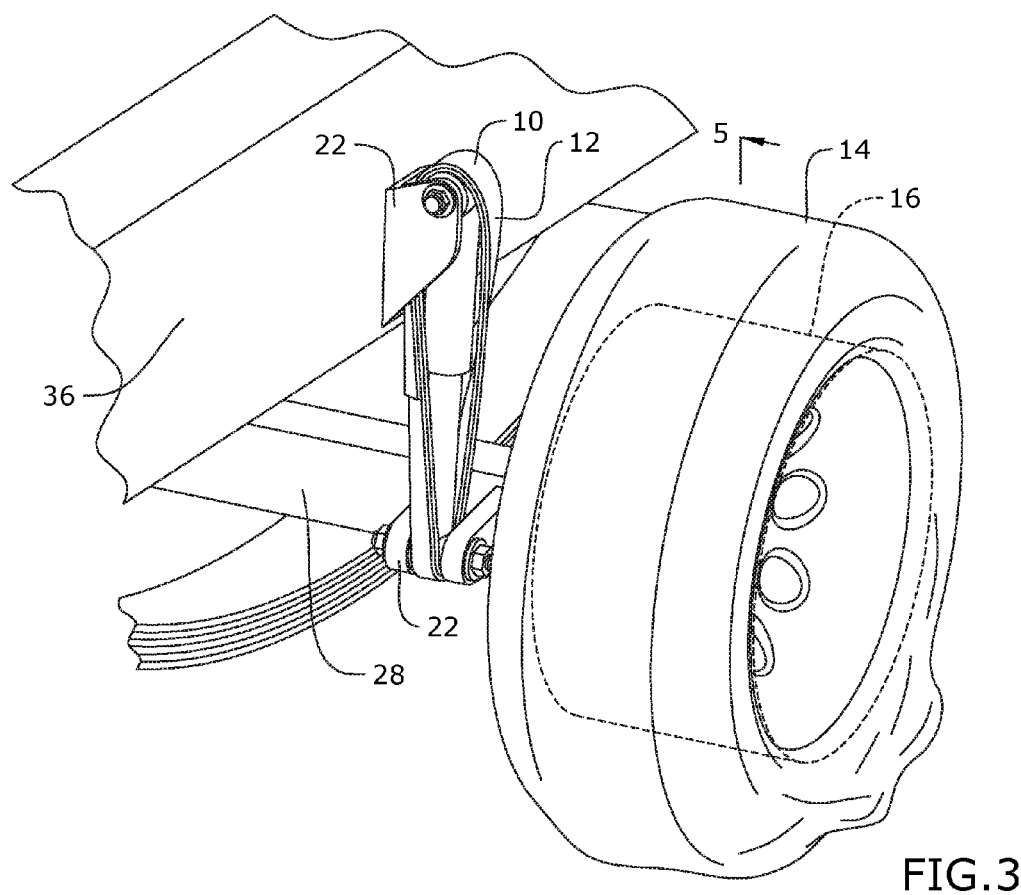
FIG. 3 depicts a perspective view of certain embodiments of the safety strap apparatus shown in use.

As depicted in FIGS. 1-3, safety strap apparatus 10 is configured for use with a vehicle such as a commercial truck (not shown) to protect tire 14 and rim 16 from damage during a tire blowout. In use, safety strap apparatus 10 is disposed around upper and lower portions of shock absorber 12, which is coupled to tire axle 28 and truck frame 36 by mounting brackets 22 and mechanical fasteners such as bolts. Tire 14 is preferably a super single tire used for trucks. However, safety strap apparatus 10 may be beneficial for use with alternative types of tires known in the field.

As depicted in FIG. 1, safety strap apparatus 10 comprises a strap assembly comprising first elongated strap 30 and second elongated strap 32, which are both preferably made from heavy-duty nylon. However, other high-strength polymers or materials known in the field may be used. First and second elongated straps 30, 32 are aligned and coupled together by primary stitching members 26 such that a left end portion of the strap assembly comprises end portions of first and second elongated straps 30, 32 and a right end portion of the strap assembly comprises another end portion of first elongated strap 30. In one embodiment, primary stitching members 26 are oriented generally parallel to each other and located proximate opposing side edges of first and second elongated straps 30, 32. In one embodiment, a pair of primary stitching members 26 is located proximate each side edge of first and second elongated straps 30, 32. Primary stitching members 26 are preferably made from commercial grade thread.

The left and right end portions of the strap assembly are coupled together by end stitching members 24 to create a loop. End stitching members 24 are preferably made from commercial grade thread. In a preferred embodiment, end stitching members 24 comprise a plurality of stitching members oriented generally parallel to each other and evenly spaced throughout a width of the left and right end portions of the strap assembly. This configuration of straps and stitching members enhance the strength of first and second elongated straps 30, 32 to withstand a weight load of at least 12,400 lbs.

In certain embodiments, safety strap apparatus 10 is approximately 27" long, 2½" wide and ⅜" thick. However, it shall be appreciated that dimensions of safety strap apparatus 10 may vary to accommodate different sized trucks, tires and/or rims.

Figure 4:
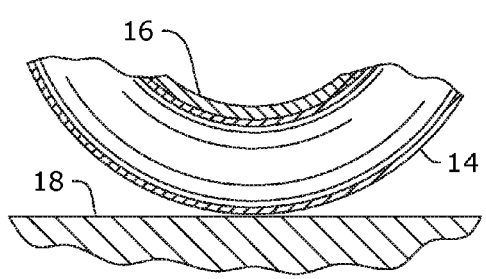
FIG. 4 depicts a section view of certain embodiments of the safety strap apparatus taken along line 4-4 in FIG. 2.
Figure 5:
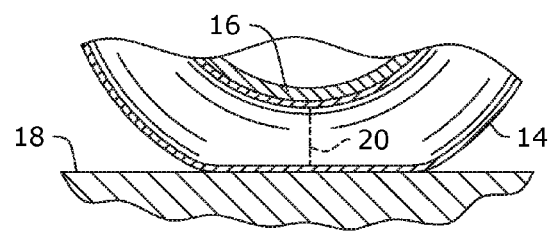
FIG. 5 depicts a section view of certain embodiments of the safety strap apparatus taken along line 5-5 in FIG. 3.

In operation, shock absorber 12 is removed from mounting brackets 22 by removing the mechanical fasteners. Safety strap apparatus 10 is disposed around the top and bottom portions of shock absorber 12. Shock absorber 12 is then secured to mounting brackets 22 by the mechanical fasteners. As depicted in FIGS. 2 and 4, safety strap apparatus 10 is depicted in the assembled configuration. During a tire blowout, shock absorber 12 extends vertically, which causes tire axle 28 to drop down. However, as depicted in FIGS. 3 and 5, tension in safety strap apparatus 10 limits the extension of shock absorber 12 and prevents further downward movement of tire axle 28, which maintains gap 20 between rim 16 and ground 18. This action permits safety strap apparatus 10 to support rim 16 above ground 18. As a result, significant damage to rim 16 and tire 14 is prevented or minimized.

Figure 6:
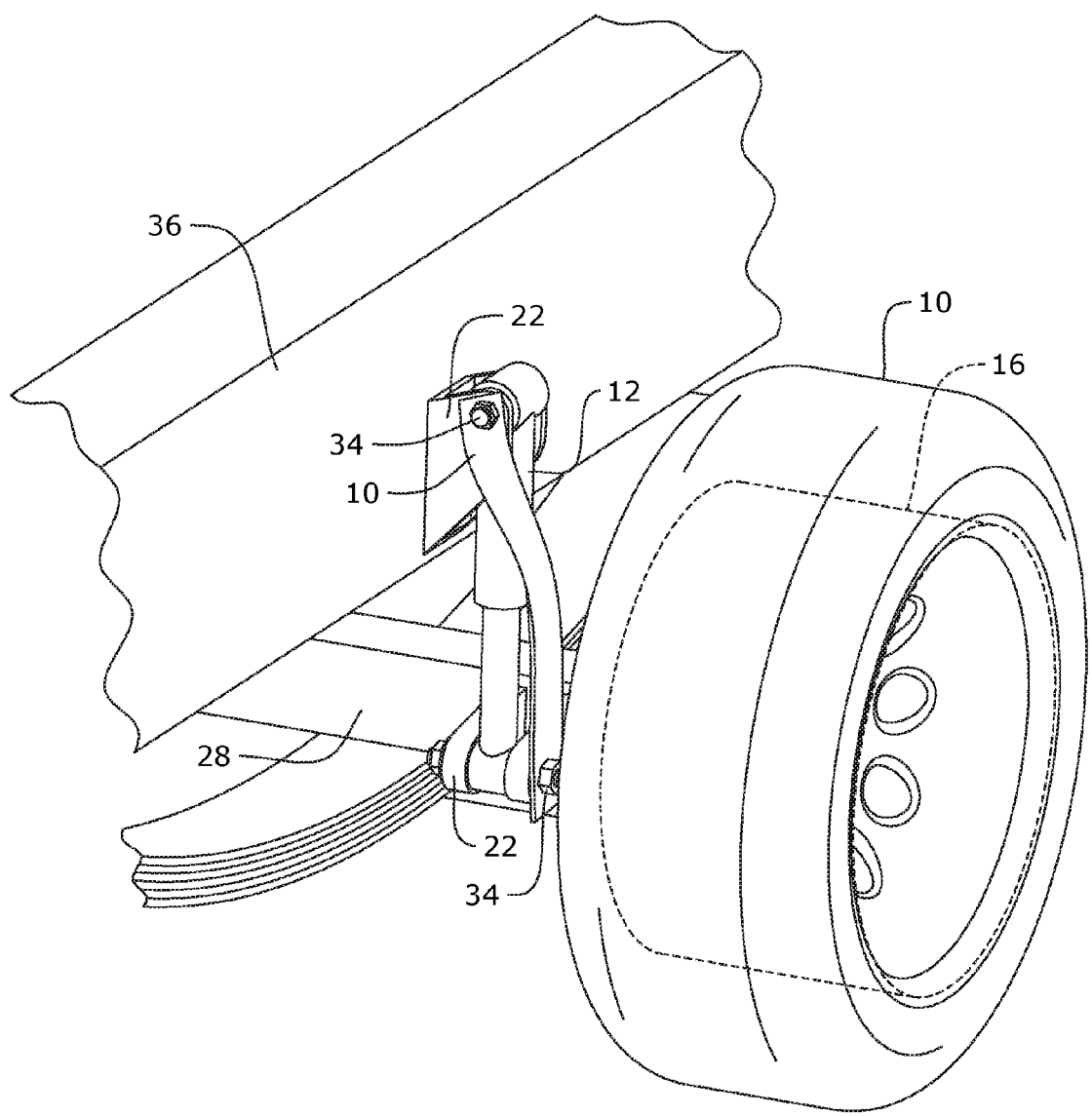
FIG. 6 depicts a perspective view of an alternative embodiment of the safety strap apparatus shown in use.

FIG. 6 depicts an alternative embodiment of safety strap apparatus 10, which comprises the same materials as discussed in other embodiments. In one embodiment, safety strap apparatus 10 comprises a pair of elongated straps aligned together and coupled by stitching (not shown). Each end of the pair of elongated straps comprises an opening configured to receive bolt 34. Bolts 34 secure safety strap apparatus 10 directly to mounting brackets 22, which secure shock absorber 12 in place. In one embodiment, each opening in the pair of elongated straps is reinforced with a metal eyelet (not shown). The alternative safety strap apparatus 10 limits the extension of shock absorber 12 during a tire blowout, which supports rim 16 above ground 18.

It shall be appreciated that the components of safety strap apparatus 10 described in several embodiments herein may comprise any alternative known materials in the field and be of any color, size and/or dimensions. It shall be appreciated that the components of safety strap apparatus 10 described herein may be manufactured and assembled using any known techniques in the field.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A safety strap apparatus with enhanced strength for use with a super single tire of a vehicle to protect a rim of the super single tire from damage during a blowout of the tire, the super single tire and rim being coupled to an axle mechanically coupled to a frame of the vehicle by a shock absorber, the safety strap apparatus configured to prevent the rim from contacting a ground surface during the tire blowout, the safety strap apparatus comprising:
   a strap assembly comprising a first elongated strap coupled to a second elongated strap and oriented such that the first and second elongated straps are aligned together, the strap assembly comprising a left end portion and a right end portion, the left end portion comprising an overlapped portion comprising end portions of the first and second elongated straps, the right end portion comprising another end portion of the first elongated strap, the left and right end portions of the strap assembly being coupled together to create a loop;
   wherein the loop of the strap assembly is configured to be disposed around a top portion of the shock absorber and a bottom portion of the shock absorber, wherein tension in the strap assembly supports the rim above the ground surface during the blowout of the tire.

2. The safety strap apparatus of claim 1, wherein the first and second elongated straps are coupled together by primary stitching members oriented generally parallel to each other and extending proximate opposing side edges of the first and second elongated straps.

3. The safety strap apparatus of claim 2, wherein the left and right end portions of the strap assembly are coupled together by a plurality of end stitching members oriented generally parallel to each other and evenly spaced throughout a width of the left and right end portions of the strap assembly.

4. A safety strap apparatus with enhanced strength for use with a super single tire of a vehicle to protect a rim of the super single tire from damage during a blowout of the tire, the super single tire and rim being coupled to an axle mechanically coupled to a frame of the vehicle by a shock absorber, the safety strap apparatus configured to prevent the rim from contacting a ground surface during the tire blowout, the safety strap apparatus comprising:
   a strap assembly comprising a first elongated strap coupled to a second elongated strap and oriented such that the first and second elongated straps are aligned together, the strap assembly comprising a left end portion and a right end portion, each end portion of the left and right end portions comprising an opening;
   a first fastener disposed through the opening of the left end portion and configured to secure the strap assembly to a top portion of the shock absorber;
   a second fastener disposed through the opening of the right end portion and configured to secure the strap assembly to a bottom portion of the shock absorber;
   wherein tension in the strap assembly supports the rim above the ground surface during the blowout of the tire.

5. The safety strap apparatus of claim 4, wherein the first and second elongated straps are coupled together by primary stitching members oriented generally parallel to each other and extending proximate opposing side edges of the first and second elongated straps.

6. The safety strap apparatus of claim 5, further comprising a first eyelet coupled to the opening in the left end portion and a second eyelet coupled to the opening in the right end portion.

* * * * *